J. L. GRAY.
Preserve Can.

No. 63,505.

Patented April 2, 1867.

Witnesses:
R. S. Campbell.
Edw Schofer.

Inventor:
J. L. Gray
by
Mason Fenwick & Lawrence.

UNITED STATES PATENT OFFICE.

JAMES L. GRAY, OF BALTIMORE, MARYLAND, ASSIGNOR TO F. M. HAY, M. L. GRAY, AND M. A. GRAY, OF SAME PLACE.

IMPROVEMENT IN PRESERVE-CANS.

Specification forming part of Letters Patent No. 63,505, dated April 2, 1867.

*To all whom it may concern:*

Be it known that I, JAMES L. GRAY, of the city and county of Baltimore and State of Maryland, have invented a new and Improved Preserve-Can; and I do hereby declare that the following is a full, clear, and exact description thereof, reference being had to the accompanying drawings, making a part of this specification, in which—

Figure 1:
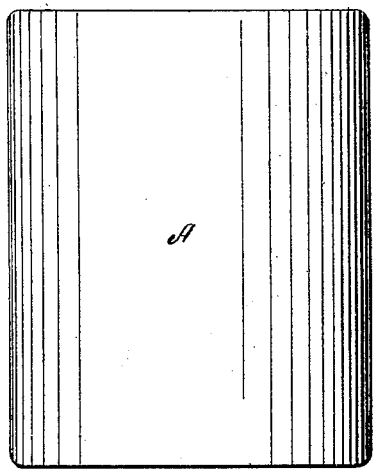
Figure 2:
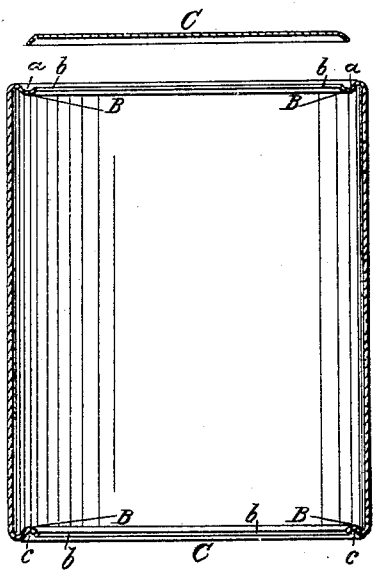
Figure 4:
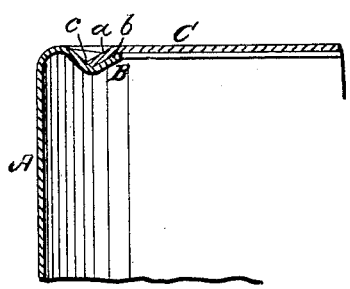
Figure 3:
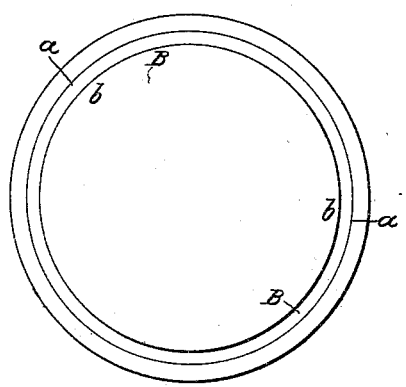

Figure 1 is a side view of the improved can. Fig. 2 is a diametrical section through the can, showing the construction of its ends to receive the cap and bottom plates. Fig. 3 is a top view of the can without the cap or cover. Fig. 4 is an enlarged sectional view of the V-groove in one end of the can.

Similar letters of reference indicate corresponding parts in the several figures.

This invention relates to a new and improved metallic can, which is designed for the preservation of fruits, oysters, and other articles, and for the purpose of transporting such articles from one place to another.

The object of my invention is to secure the caps and bottoms upon metallic cans in a stronger and more permanent manner, by forming upon the ends of the body of a can grooved or channeled flanges, which are adapted for receiving rims which are formed on the cap and bottom plates, and also the cement or solder which secures such plates in place, said channels being so formed as to increase the strength of the cans, and to prevent them from being crushed or opened during transportation, as will be hereinafter described.

To enable others skilled in the art to understand my invention, I will describe its construction and operation.

The cylindrical body of the can, which is made of thin sheet metal, is subjected to crimping-dies suitably adapted to the purpose, and the ends of the cylinder A are bent inward and grooved, so as to form the flanges B B, for receiving the cap and bottom plates C C. The channels *a a* in the flanges B B are of a V shape in cross-section, and the inner edges thereof are bent outward, so as to form beveled seats for receiving the corresponding beveled lips *b b*, which are formed on the cap and bottom plates C, as shown in Figs. 2 and 4.

The channels thus formed not only serve as seats for the plates C, but they receive the required quantity of solder or cement, *c*, for securing said plates firmly in place, and so covering the joints as to render them perfectly air-tight. This mode of forming the seats for the cap and bottom plates on the cylinder A affords much greater strength to the can than would be the case if said seats or flanges were made separate and afterward soldered to the ends of the can, as hitherto; besides which, by forming the flanges on the body of the can, soldered connections at the angles of the can, which are so liable to break, are obviated, and only two soldered joints at the ends of the can are rendered necessary. The turning over of the ends of the can, as stated, also prevents the seam which unites the edges of the cylinder A from being opened when the can is exposed to rough usage.

One of the great advantages of my improved can over cans heretofore made is the strength which is afforded by the form given to the flanged seats, and the production of these seats upon the cylinder, as explained.

Another advantage is the facility with which the cap and bottom plates can be soldered in place, the joints being so exposed before soldering that any imperfection can be readily discovered and remedied by soldering.

Another advantage arises from the fact that the inner edges of the flanges are turned outward, so as to allow of the filling of the can without having the substance flow over into the channel and prevent the soldering on of the cap.

I am aware that preserve-cans have been constructed with depressions in their upper ends for receiving the covers or top plates of the cans, but such depressions are stamped in separate rings, which are soldered on the ends of the cans, and therefore I do not claim, broadly, the seating of caps and bottoms of cans into depressions.

I do not desire to limit my invention to forming the peculiar cap-seats herein described upon both ends of the can, as such cap-seat may be formed on one end only of the can, the other end being closed in any of the well-known modes.

What I claim as new, and desire to secure by Letters Patent, is—

1. A preserve-can which has formed on its ends grooved flanges, the grooves of which are adapted for receiving the edges of the cap and bottom plates, and strengthening the ends of the can, substantially as described.

2. A can which has one or both of its edges turned inward and crimped so as to leave a V-shaped groove or grooves, substantially as and for the purposes described.

JAMES L. GRAY.

Witnesses:
 FRANCIS M. HAY,
 R. T. CAMPBELL.